United States Patent [19]
Zank

[11] Patent Number: 5,837,364
[45] Date of Patent: *Nov. 17, 1998

[54] CERAMIC MATRIX COMPOSITES USING MODIFIED HYDROGEN SILSESQUIOXANE RESIN

[75] Inventor: Gregg Alan Zank, Midland, Mich.

[73] Assignee: Dow Corning Corporation, Midland, Mich.

[*] Notice: The term of this patent shall not extend beyond the expiration date of Pat. No. 5,508,238.

[21] Appl. No.: 734,642

[22] Filed: Oct. 21, 1996

Related U.S. Application Data

[63] Continuation of Ser. No. 439,263, May 11, 1995, abandoned.

[51] Int. Cl.⁶ ................................................ C04B 35/56
[52] U.S. Cl. ...................... 428/312.6; 428/312.2; 428/312.8; 428/317.9; 428/318.4; 428/319.1; 428/366; 428/367; 428/368; 428/378; 428/379; 428/446; 428/698; 428/704
[58] Field of Search ...................... 428/698, 378, 428/367, 446, 379, 368, 366, 312.2, 312.6, 312.8, 317.9, 318.4, 319.1, 704

[56] References Cited

U.S. PATENT DOCUMENTS

| | | | |
|---|---|---|---|
| 3,615,272 | 10/1971 | Collins et al. | 23/366 |
| 4,460,639 | 7/1984 | Chi et al. | 428/367 |
| 4,460,640 | 7/1984 | Chi et al. | 428/367 |
| 4,642,271 | 2/1987 | Rice | 428/698 |
| 4,756,977 | 7/1988 | Haluska et al. | 428/704 |
| 5,010,159 | 4/1991 | Bank et al. | 528/23 |
| 5,242,866 | 9/1993 | Leung et al. | 501/12 |
| 5,318,930 | 6/1994 | Leung et al. | 501/32 |
| 5,354,602 | 10/1994 | Stranford et al. | 428/328 |
| 5,508,238 | 4/1996 | Zank | 506/87 |

FOREIGN PATENT DOCUMENTS

| | | | |
|---|---|---|---|
| 0606 588 A1 | 8/1993 | European Pat. Off. | C23C 18/12 |
| WO 93/14040 | 7/1993 | WIPO | C03C 14/00 |

*Primary Examiner*—Archene Turner
*Attorney, Agent, or Firm*—Sharon K. Severance

[57] ABSTRACT

Disclosed are novel ceramic matrix composites in which coated refractory fibers are imbedded in a ceramic matrix derived from a modified hydrogen silsesquioxane resin.

17 Claims, No Drawings

CERAMIC MATRIX COMPOSITES USING MODIFIED HYDROGEN SILSESQUIOXANE RESIN

This application is a continuation of application Ser. No. 08/439,263 filed May 11, 1995 which application is now abandoned.

BACKGROUND OF THE INVENTION

The present invention relates to novel ceramic matrix composites using modified hydrogen silsesquioxane resin as the matrix for refractory fibers. These composites can be formed into complex shapes which have good oxidation resistance at high temperatures, high strength and toughness.

Ceramic matrix composites and methods for their production are well known in the art. For instance, several recent review articles such as Mah et al., Ceramic Bulletin, Vol. 66, No. 2 (1987), and is Schioler et al., Ceramic Bulletin, Vol. 65, No. 2 (1986), describe various matrices and fibers used in ceramic matrix composites as well as a variety of processing techniques used for their production. The composite materials and methods described in these references, however, differ from those described herein.

Similarly, Chi et al. in U.S. Pat. Nos. 4,460,639 and 4,460,640 and Haluska in U.S. Pat. No. 4,460,630 describe ceramic matrix composites and their methods of manufacture. It is taught therein that organosilsesquioxanes, organopolysiloxanes and polysilazanes, respectively, can be used as matrix precursors in polymer infiltration processes. These references, however, do not describe the use of hydrogen silsequioxane resin as the polymeric matrix precursor.

Hydrogen silsesquioxane resin is also known in the art. For instance, Collins et al. in U.S. Pat. No. 3,615,272 describe the production of soluble hydrogen silsesquioxane resin by the hydrolysis and condensation of a silane in a sulfuric acid medium. Similarly, Haluska et al. in U.S. Pat. No. 4,756,977 teach the use of hydrogen silsesquioxane resin to form protective ceramic coatings on electronic devices. These references, however, do not describe the modification of the resin nor the use of the resin as a matrix precursor in ceramic matrix composites.

The present inventors have unexpectedly found that modified hydrogen silsesquioxane resin can be used to prepare ceramic matrix composites with excellent properties.

SUMMARY OF THE INVENTION

The present invention relates to a method of making fiber reinforced ceramic matrix composites. The method comprises impregnating coated fibers with a matrix precursor mixture comprising modified hydrogen silsesquioxane resin and, optionally, ceramic fillers. The impregnated fibers are formed into the desired shape and cured to form a molded part. The molded part is then heated to a temperature of at least about 1000° C. in an inert atmosphere for a time effective to convert the matrix precursor mixture to a ceramic. If desired, composites derived in the above manner can be reimpregnated with the matrix precursor mixture to decrease the open porosity.

DETAILED DESCRIPTION OF THE INVENTION

The present invention is based on the discovery that novel ceramic matrix composites may be formed using modified hydrogen silsesquioxane resin as the matrix precursor. This was particularly unexpected since hydrogen silsesquioxane resin does not have carbon in its repeating units and high carbon levels were thought to be essential in the fabrication of desirable composites. The present inventor has now found that the present composites containing small amounts of carbon have excellent strength and toughness even at elevated temperatures in air.

The refractory fibers which may be used in this invention comprise any high-modulus fibers which are compatible with the modified hydrogen silsesquioxane resin, matrices and any fiber coatings described herein and which can withstand the polymer infiltration processing. Many of these fibers are known in the art and many are commercially available. Examples of suitable fibers include those of silicon carbide, silicon nitride, silicon carbide deposited on a carbon core, aluminum borate, aluminum oxide, silicon oxide, silicon carbide containing titanium, silicon oxycarbides, silicon oxycarbonitrides, carbon and the like. Generally, such fibers should have a modulus greater than about 100 GPa, preferably greater than 150 GPa. These fibers may contain any desirable number of filaments per tow and have a size in the range of about 5 micrometers to about 500 micrometers.

Examples of specific fibers include silicon carbide fibers with a diameter in the range of 10–20 micrometers manufactured by Nippon Carbon and sold under the trade name "Nicalon"; fibers comprising silicon carbide deposited on a carbon core with a diameter of about 143 micrometers manufactured by Avco and designated "SCS-6"; alumina-boria-silica fibers with a diameter of about 10–12 micrometers manufactured by 3M and sold under the tradenames "Nextel 312", "Nextel 440" and "Nextel 480"; Al2O3 fibers with a diameter of about 20 micrometers manufactured by Du Pont under the designation "FP"; $SiO_2$ fibers with a diameter of about 8–10 micrometers manufactured by J. P. Stevens; Al2O3-SiO2 fibers with a diameter in the range of about 9–17 micrometers manufactured by Sumitomo; silicon carbide fibers containing titanium with a diameter in the range of 8–10 micrometers manufactured by Ube and sold under the tradename "Tyranno"; silicon carbide fiber with a diameter in the range of about 6–10 micrometers manufactured by Avco; silicon oxycarbonitride fibers with a diameter in the range of about 10–15 micrometers manufactured by Dow Corning designated "MPDZ" and "HPZ"; silicon carbide fibers with a diameter in the range of about 10–15 micrometers manufactured by Dow Corning designated "MPS"; silicon nitride fibers such as those produced by Tonen or Rhone Poulanc, Al2O3-ZrO2 fibers with a diameter of about 20 micrometers manufactured by Du Pont and Designated "PRD-166" and crystalline silicon carbide fibers produced by Dow Corning Corp.

Although any of the above fibers are functional, those preferred herein comprise ceramic fibers of silicon, carbon, nitrogen and/or oxygen. Especially preferred are "Nicalon" silicon oxycarbide fibers and crystalline silicon carbide fibers.

These fibers may be used in nearly any length and may be arranged in the matrix in nearly any manner desired. Generally, the fibers are essentially continuous and are either aligned unidirectionally, woven as a 2-dimensional fabric or shaped as a 3-dimensional reinforced preform. Such versatility in architecture is another advantage of the present composite system over prior art composites.

The fibers of this invention may also be provided with a coating to toughen the composite by preventing bonding and chemical reactions between the fibers and the matrix. This allows the fibers to debond and pullout under stress such that the composite does not undergo catastrophic failure as demonstrated by ceramic monoliths. Generally, any interfacial coating which has the above effect and which is compatible with the fiber and the matrix may be used herein. These include, for example, coatings of carbon, boron nitride, silicon carbide, silicon nitride, aluminum nitride, and combinations of the above. Such coatings and methods for their deposition are well known in the art. For instance, Corbin et al. in U.S. Pat. No. 4,885,199 describe the aonlication of various interfacial coatings such as carbon on ceramic fibers, Rice in U.S. Pat. No. 4,642,271 describe the chemical vapor deposition of boron nitride on fibers, and Chyung et al. in EPA 90311185.4 describe the application of B—N—C coatings on fibers. Additionally, it is noted that certain fibers, when heated in the matrix, form in-situ interfacial layers such as carbon or boron nitride which may serve the same purpose as those described above.

The coatings of the invention are generally used in thicknesses which allow the fibers to debond and pullout under stress. Although the thickness is dependent on coating quality, typical thicknesses are generally in the range of about 0.05 to about 1.0 micrometer.

Especially preferred in the present invention is the use of boron nitride coatings or coating combinations which contain boron nitride. The present inventors have discovered that when fibers with such coatings are incorporated within the matrix of the present invention they have novel long-term stability at elevated temperature in air. This was particularly unexpected since boron nitride coated fibers are known to undergo oxidative degradation under such conditions. Thus, the composites of the present invention retain their properties under conditions which adversely affect the prior art composites.

The matrix precursor material to be used herein is modified hydrogen silsesquioxane resin (H-resin). Hydrogen silsesquioxane resin is formed by the hydrolysis or partial hydrolysis of $HSiX_3$, wherein X is a hydrolyzeable substituent. Exemplary hydrolyzable substituents include halogens such as chlorine, fluorine, bromine and the like and hydrocarbonoxy groups such as alkoxy, acyloxy and the like. The resultant resins have the formula $HSi(OH)_x(X)_yO_{z/2}$, in which each X is a hydrolyzable substituent as defined above, x=0–2, y=0–2, z=1–3, x+y+z=3. As such, these resins may be fully condensed $(HSiO_{3/2})_n$ or they may be only partially hydrolyzed (i.e., containing some Si—X) and/or partially condensed (i.e., containing some Si—OH). Although not represented by this structure, these resins may contain a small number (eg., less than about 10%) of silicon atoms which have either 0 or 2 hydrogen atoms attached thereto due to various factors involved in their formation or handling.

Methods for producing hydrogen silsesquioxane resin are known in the art. For example, it is known to hydrolyze an alkoxy or acyloxy silane with water in an acidic, alcoholic hydrolysis medium. Similarly, Collins et al. in U.S. Pat. No. 3,615,272, which is incorporated herein by reference, teach the production of a nearly fully condensed H-resin (which may contain up to 100–300 ppm silanol) by a process comprising hydrolyzing trichlorosilane in a benzenesulfonic acid hydrate hydrolysis medium and then washing the resultant resin with water or aqueous sulfuric acid. Additionally, Bank et al. in U.S. Pat. No. 5,010,159, which is hereby incorporated by reference, teach an alternative method comprising hydrolyzing hydridosilanes in an arylsulfonic acid hydrate hydrolysis medium to form a resin which is then contacted with a neutralizing agent.

The hydrogen silsesquioxane resin used in this invention is generally modified to render it useful in the formation of ceramic composites. Without modification, hydrogen silsesauioxane resin has a broad molecular weight range which can lead to a wide variability in the physical properties of the resin which, in turn, lead to variability in processing. Additionally, the broad molecular weight range of the resin can lead to decreased ceramic yields due to vaporization of low molecular weight species.

The present inventor, therefore, has discovered a method for tailoring the molecular weight distribution of the resin to eliminate these problems. This tailoring affords one the ability to make resins having, for instance, the appropriate rheological properties needed for ceramic fabrication techniques such as cloth lay-up of ceramic matrix composites, RTM of ceramic matrix composites and reinfiltration of porous ceramic bodies. Similarly, the modification renders the resin curable under moderate conditions such as mild heat, radiation, curing catalysts or curing agents. This curability is essential to the invention to increase the ceramic yield and to inhibit the composite from delaminating during pyrolysis.

Generally, the H-resin modification is performed by encapping the resin with a material containing Si—C and Si—H bonds. Examples of such materials are those generally encompassed by the structure $(R_1R_2R_3Si)_2O$, wherein $R_1$, $R_2$, and $R_3$ are independently selected from hydrogen, alkyls such as methyl, ethyl, propyl and the like or aryls such as phenyl. Specific compounds include tetramethyldisiloxane, hexamethyldisiloxane and the like.

The endcapping and molecular weight control is generally accomplished by redistribution under acid/water conditions in the presence of the endcapping agent. The ratio of the H-resin to endcapping agent in this reaction can be used to tailor the molecular weight of the resin. Generally, the molar ratio of H-resin to endcapping agent is in the range of about 10:1 to about 1:10.

The expression "modified hydrogen silsesquioxane resin", therefore, is used to describe these endcapped resins which are curable and have tailored molecular weights. Preferably, the Mn for these materials are in the range of about 500 to about 2500.

The modified hydrogen silsesquioxane resin has the structure $(HSiO_{1.5})_x(R_1R_2R_3SiO_{0.5})_y$, wherein $R_1$, $R_2$, and $R_3$ are independently selected from hydrogen, alkyls and aryls, x is 0.25 to 0.99, y is 0.01 to 0.75 and x+y=1.0. Preferably, $R_1$, $R_2$, and $R_3$ are independently selected from hydrogen and methyl, x is 0.5 to 0.99, y is 0.01 to 0.5 and x+y=1.0. More preferably, the modified hydrogen silsesquioxane resin has the structure $(HSiO_{1.5})_x(Me_2HSiO_{0.5})_y$, wherein x is 0.5 to 0.99, y is 0.01 to 0.5 and x+y=1.0.

When the resultant resin is pyrolyzed, the char composition has a stoichiometry of approximately $SiO_yC_z$, wherein y=1.2 to 1.6 and z=0.2 to 0.6. Although not wishing to be bound by theory, it is thought that when a composite incorporating such a resin is heated in an oxidizing environment, the surfaces of the composite exposed to the environment form in-situ silica $(SiO_2)$ coatings. These coatings seal the exposed surface and protect the matrix and the interfacial coating on the fiber from further oxidation when subsequently heated in an oxidizing environment.

In addition to the above fibers and matrices, the composites of the present invention may also contain fillers. Fillers are used herein to decrease the amount of matrix shrinkage which occurs on pyrolysis so that the resultant composites have lower porosity. Suitable fillers are known in the art and can include, for example, powders, whiskers or particulates of Al2O3, SiO2, other metal oxides, silicon carbide, silicon nitride, silicon hexaboride, aluminum nitride, boron nitride and the like. The preferred fillers to be used herein are boron nitride, silicon carbide, silicon nitride, and aluminum nitride. Such fillers are generally included in amounts up to about 80 volume percent based on the volume of modified H-resin material.

The composites of this invention may also contain materials which assist in curing (crosslinking) the H-resin. These curing agents may be activated by heating the green body containing the curing agent to temperatures in the range of 50°–300° C. (i.e., the activation of a free radical precursor) or they may be crosslinked at room temperature.

Curing agents are well known in the arc. Examples include free radical precursors such as organic peroxides (dibenzoyl peroxide, bis-p-chlorobenzolperoxide, bis-2,4-d-chlorobenzolperoxide, di-t-butyl peroxide, dicumyl peroxide, t-butyl perbenzoate, 2,5-bis(t-butylperoxy)-2,3-dimethylhexane and t-butyl peracetate); and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the H-resin. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of crosslinking agents include, for example, polyfunctional organosilicon compounds such as silanes, silazanes or siloxanes. The preferred crosslinking agents are organosilicon compounds with Si—H or Si—Vi functional bonds.

The composites herein are produced by polymer infiltration. This process comprises first impregnating the coated fibers with a liquid preceramic mixture comprising the modified H-resin and, if desired, fillers. This preceramic mixture can be formed by either a solution or melt route. In the solution route the modified H-resin and fillers are mixed in an organic solvent. The preferred solvents are those with a low vaporization point (such as lower than about 125° C.) at atmospheric pressure to facilitate removal from the impregnated fibers and those with less than about 1 percent by weight water. Examples of suitable organic solvents include aliphatic hydrocarbons such as hexane, heptane etc. and aromatic hydrocarbons such as benzene, toluene, etc.

The concentration of H-resin in solution can be varied over a wide range with higher concentrations generally resulting in larger amounts of the preceramic polymer impregnating the fiber. Preferably, concentrations in the range of about 30 to about 60 weight percent are employed herein.

In the melt route, the modified H-resin is heated to a temperature above its melting point yet below its curing temperature in an inert environment to form the preceramic mixture. Fillers may also be mixed in the molten polymer if desired.

The fibers are then impregnated with the preceramic mixture by any convenient means. For instance, the fibers can be immersed in the mixture, sprayed with the mixture, held under a stream of the mixture, etc. The impregnated fibers can additionally be manipulated to uniformly distribute the matrix mixture in the fibers. Following impregnation, any excess matrix mixture on the fibers is allowed to drain off.

If the solution route to the preceramic mixture was used, the solvent is allowed to evaporate. Generally, any practical method such as air evaporation at room temperature or the use of vacuum or mild heat may be used. The resultant fibers which have been impregnated and the solvent evaporated are commonly called a "pre-preg".

If the melt method to the preceramic mixture is used, the impregnated fibers can merely be cooled to form the "pre-preg". Alternatively, however, the melt impregnated fibers may be formed prior to cooling by a process such as filament winding or pulltrusion. When these formed fibers are cooled, they can be immediately cured and fired as set forth below.

The prepregs formed above may, optionally, be partially cured so that they will hold the shape imparted in a subsequent step. This partial curing, also called "B-staging", is generally accomplished by heating in air at a temperature in the range or about 50° to about 150° C. for about 2 minutes to about 4 hours. Generally, heating at about 100° C. for 10 to 15 minutes is sufficient. This heating may be conducted by any appropriate means, but the use of an air convection oven or similar equipment is usually sufficient. Care should be taken during this curing step to avoid temperature and time combinations which result in excessive curing such that flowability of the resin in the later molding or pressing steps is significantly reduced.

The prepreg is then subjected to externally applied pressure while heating Lo form the composite into the desired shape and cause uniformity of resin about the fibers. Generally, this is accomplished by pressing the prepreg into a mold at a temperature and pressure which allows the resin to flow throughout the mold. The pressing conditions generally used include temperatures in the range of about 60° to about 300° C., pressures in the range of about 0.07 to 175 $kg/cm^2$, and times in the range of about 2 minutes to about 6 hours. Pressing at about 175° C., 1–28 $kc/cm^2$ and 30 to 180 minutes generally provides satisfactory results. Temperatures and pressures which result in resin being forced out of the mold should be avoided.

It should be noted that if a 3-dimensional shape is desired, the above steps are often altered. To manufacture 3-D objects by this process, one generally first forms the fiber into the desired shape and then impregnates the formed fiber with the polymer mixture. The impregnated fibers are then pressed, cured, and fired as set forth herein.

The formed prepreg is next infusibilized (cured) to insure complete or nearly complete crosslinking such that deformation on pyrolysis will not occur. Any schedule which produces the desired result may be used so long as the temperature does not cause ceramification. A preferred schedule comprises heating at less than 5° C./minute to 285° C. and then holding for 16 hours. This curing step may be performed in the mold under pressure or it may be accomplished in a conventional oven under nitrogen without any applied pressure.

The pressed and cured product (green composite or molded part) is then slowly fired in a furnace to a temperature of at least 1000° C. in an inert atmosphere or vacuum until the product ceramifies. It is preferred that the green composite be fired at a temperature of about 1200° C. By slow firing it is meant that the composites are heated in a slow (eg., 2° C./min), stepwise or linear fashion until the majority of any higher boiling volatiles present escape the composite after which time the temperature can be quickly raised to the ultimate firing temperature. For example, the temperature for most composites should be raised to about 300° C. and the heating slowly continued until a temperature of about 800° C. is reached after which the temperature can be raised rather quickly to the ultimate firing temperature.

After completion of the firing process the composite is cooled. At least the initial cooling should also be under an inert atmosphere. When cooled, the resulting material is a uniform, hard, strong fiber reinforced composite. The volume percentage of fibers in the resulting composite can vary over a wide range depending on the desired use. Generally, it is preferred that about 10 to 65 volume percent of the composite is fiber.

The composites formed by the above process are generally quite porous. Since it may be preferred to produce dense objects (which have higher strength), it is within the scope of this invention to reimpregnate the composites formed above. This is accomplished by merely impregnating the composite with the preceramic matrix mixture (without fillers) as described above (by either the solution or melt route), curing the reimpregnated composite and then firing. This "reimpregnation" can be repeated until products with the desired density and strength are achieved.

The composites herein have many desirable properties such as good oxidation resistance at high temperatures, high strength and toughness, and a wide range of dielectric properties. For instance, the four-point flexural strength of the composites measured at room temperature and at temperatures up to 1100° C. in air generally exceed 2100 kg/cm$^2$ and often exceed 3500 kc/cm$^2$. Similarly, the tangent modulus of these composites often exceed 700,000 kg/cm$^2$.

The following non-limiting examples are provided so that one skilled in the art might better understand the invention.

Throughout this specification "Me" represents a methyl group, "Ph" represents a phenyl group and "Vi" represents a vinyl group.

All reaction were carried out in an argon atmosphere in laboratory glassware. Hydrogen sIlsesquioxane resIn was obtained from Dow Corning Corporation and was produced by the method of U.S. Pat. No. 3,615,272. (Me$_2$HSi)$_2$O was purchased from Huls Systems. Trifluromechaneacetic acid was purchased from Aldrich Chemical.

All NMR spectra were recorded on a Varian VXR200T spectrometer. Solution spectra were recorded in CDCl$_3$ in a 5 mm switchable probe ($^1$H, 399.95 MHz) or a 16 mm Si-free probe ($^{29}$Si, 79.46 MHz) and referenced to internal CDCl$_3$ (7.25 ppm, $^1$H) or TMS (0 ppm). The integrals were normalized and calculated relative to the siloxane species. Cr(acac)$_3$ (0.02M) was added for the $^{29}$Si spectra to ensure quantitative acquisition.

Gel permeation chromatography (GPC) data were obtained on a Waters GPC equipped with a model 600E systems controller, a model 490 UV and model 410 Differential Defractomecer detectors interfaced to a Digital Professional 380 computer employing Waters 'Expert' software; all values are relative to polystyrene standards.

Carbon, hydrogen and nitrogen analysis were done on a Control Equipment Corporation 240-XA Elemental Analyzer. Oxygen analyses were done on a Leco Oxygen Analyzer equipped with an Oxygen Determinator 316 (Model 783700) and an Electrode Purnace EF100. Silicon was determined by a fusion technique which consisted of converting the silicon material to soluble forms of silicon and analyzing the solute for total silicon by atomic absorption spectrometry.

All furnace firings were done in a Lindberg tube furnace, Model 54233 equipped with a Eurotherm controller.

EXAMPLE 1

Preparation of (HSiO$_{1.5}$)$_{0.90}$(Me$_2$HSiO$_{0.5}$)$_{0.10}$

Polymer Synthesis

A toluene solution (approximately 20% by weight solids) of hydrogen silsesquioxane resin, 265 g (53 g of hydrogen silsesquioxane resin), was placed in a 500 mL three necked round bottom flask fitted with an overhead stirrer, thermometer and condenser under argon. To this solution was added 67 g of (Me$_2$HSiO)$_2$ (one equivalent of (Me$_2$HSiO)$_{0.5}$, 1 g of trifluoroacetic acid and 1 g of water. The resulting solution was refluxed 24 h. The reaction was cooled and 1 g of CaCO$_3$ and 5 g of water were added to neutralize the acid. The flask was fitted with a Dean Stark trap and the water was removed by azetroping dry over an 8 h period. The reaction was cooled and 5 g of Me$_2$HSiCl added and allowed to stir overnight. The polymer was isolated by filtration through a 1.0 micrometer membrane and removing the solvent in vacuo at $_{50}$° C. The polymer was characterized by GPC molecular weight analysis: Mw=5,809; Mn=1,222 and z=4.75 and $^1$H NMR which showed a broad singlet 4.8 ppm (1H, Me$_2$HSiO$_{0.5}$), a broad multiplet at 4.4 ppm (9H, HSiO$_{1.5}$) and a broad singlet at 0.3 ppm (6.2H, (Me)$_2$HSiO$_{0.5}$).

Crosslinking and Conversion to a Ceramic

A sample of the above resin, 4.0 g, was blended with 1.0 g of vinyl functional siloxane fluid of the formula (MeSiO$_{1.5}$)$_{0.10}$(MeViSiO)$_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously pureed with argon and the sample heated to 1200° C. at 10° C./minute and held at temperature for 1 hour before cooling back to ambient temperatures. The ceramic yield was 85.3% and the ceramic analysis was C: 9.3; Si: 43.9; O: 40.95.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures.

The % weight change was found to be 0.5% and the material had the following ceramic analysis was C: 8.3; Si: 37.5; O: 41.95.

EXAMPLE 2

Preparation of (HSiO$_{1.5}$)$_{0.65}$(Me$_2$HSiO$_{0.5}$)$_{0.35}$

Polymer Synthesis

A toluene solution (approximately 20% by weight solids) of hydrogen silsesquioxane resin, 650 g (130 g of hydrogen silsesquioxane resin), was placed in a 1 L three necked round bottom flask fitted with an overhead stirrer, thermometer and condenser under argon. To this solution was added 160 g of (Me$_2$HSiO)$_2$ (2.38 equivalents of (Me$_2$HSiO)$_{0.5}$, 2.5 g of trifluoroacetic acid and 2.5 g of water. The resulting solution was refluxed 48 h. The reaction was cooled and 2.5 g of CaCO$_3$ and 10 g of water were added to neutralize the acid. The flask was fitted with a Dean Stark trap and the water was removed by azetroping dry over an 24 h period. The polymer was isolated by filtration through a 1.0 micrometer membrane and removing the solvent in vacuo at 50° C. The yield was 222 g. The polymer was characterized by GPC molecular weight analysis: Mw=4,269; Mn=1,407 and z=3.03 and $^1$H NMR which showed a broad singlet 4.7 ppm (3.5H, $Me_2HSiO_{0.5}$), a broad multiplet at 4.4 ppm (6.5H, $HSiO_{1.5}$) and a broad singlet at 0.2 ppm (12.5H, $(Me)_2HSiO_{0.5}$) and $^{29}$Si NMR which showed a broad doublet at −4.0 ppm (1 Si, $(Me)_2HSiO_{0.5}$ and a broad doublet at −85 ppm (1.68 Si, $HSiO_{1.5}$).

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 71.2% and the ceramic analysis was C: 15.1; Si: 45.5; O: 33.4.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 0° C./minute in flowing air and held at temperature for 10 hours before cooling back to ambient temperatures.

The % weight change was found to be +1.1% and the material had the following ceramic analysis C: 11.9; Si: 42.5; O: 37.5.

EXAMPLE 3

Preparation of $(HSiO_{1.5})_{0.92}(Me_2HSiO_{0.5})_{0.06}$

Polymer Synthesis

A toluene solution (approximately 40 by weight solids) of hydrogen silsesquioxane resin (Mw=9,667; Mn=1200; z=8.05), 358 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The flask was fitted with a Dean Stark trap and the water was removed by azetroping dry over an 24 h period. The polymer was isolated by filtration through a 1.0 micrometer membrane and removing the solvent in vacuo at 50° C. The yield was 160 g. The polymer has a Tg of 29° C. and was characterized by GPC molecular weight analysis: Mw=29, 010; Mn=1,653 and z=17.74 and $^{29}$Si NMR which showed a broad doublet at −3.0 ppm (1 Si, $(Me)_2HSiO_{0.5}$ and a broad doublet at −85 ppm (11.12 Si, $HSiO_{1.5}$).

As a test of the stability of this polymer the GPC molecular weight was measured twice a week for 3 weeks after which time it was apparent that the molecular weight of the polymer was drifting upwards and the polymer was becoming less soluble and leading to gelation.

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 88.7% and the ceramic analysis was C: 6.93; Si: 46.3; O: 42.5.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures.

The % weight change was found to be +1.1% and the material had the following ceramic analysis C: 5.6; Si: 44.2; O: 45.2.

EXAMPLE 4

Preparation of $(HSiO_{1.5})_{0.92}(Me_2HSiO_{0.5})_{0.08}$

Polymer Synthesis

A toluene solution (approximately 18% by weight solids) of hydrogen silsesquioxane resin (Mw=9,667; Mn=1200; z=8.05), 796 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The flask was fitted with a Dean Stark trap and the water was removed by azetroping dry over an 24 h period. The polymer was isolated by filtration through a 1.0 micrometer membrane and removing the solvent in vacuo at 50° C. The yield was 179 g. The polymer has a Tg of −39° C. and was characterized by GPC molecular weight analysis: Mw=9,194; Mn=1,338 and z=6.87 and $^{29}$Si NMR which showed a broad doublet at −3.0 ppm (1 Si, $(Me)_2HSiO_{0.5}$ and a broad doublet at −85 ppm (12.175 Si, $HSiO_{1.5}$).

As a test of the stability of this polymer the GPC molecular weight was measured twice a week for 6 weeks after which time it was apparent that the molecular weight of the polymer was not changing at all, indicating that the material was not gelling.

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 89.6% and the ceramic analysis was C: 10.17; Si: 48.7; O: 35.8.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C.

at 10° C./minute in flowing air and held at temperature for 10 hours before cooling back to ambient temperatures.

The % weight change was found to be +0.8% and the material had the following ceramic analysis C: 9.08; Si: 42.3; O: 40.3.

EXAMPLE 5

Preparation of $(HSiO_{1.5})_{0.92}(Me_2HSiO_{0.5})_{0.08}$

Polymer Synthesis

A toluene solution (approximately 18% by weight solids) of hydrogen silsesquioxane resin 796 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The flask was fitted with a Dean Stark trap and the water was removed by azetroping dry over an 24 h period. The polymer was isolated by filtration through a 1.0 micrometer membrane and removing the solvent in vacuo at 50° C. The yield was 160 g. The polymer has a Tg of 29° C. and was characterized by GPC molecular weight analysis: Mw=29,010 and Mn=1,635 and $^{29}Si$ NMR which showed a broad doublet at −3.0 ppm (1 Si, $(Me)_2HSiO_{0.5}$ and a broad doublet at −85 ppm (12.175 Si, $HSiO_{1.5}$).

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 89% and the ceramic analysis was C: 6.93; Si: 46.3; O: 42.5.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures.

The % weight change was found to be +1.1% and the material had the following ceramic analysis C: 5.57; Si: 44.2; O: 45.2.

EXAMPLE 6

Preparation of $(HSiO_{1.5})_{0.63}(Me_2HSiO_{0.5})_{0.37}$

Polymer Synthesis

A toluene solution (approximately 18% by weight solids) of hydrogen silsesquioxane resin 650 g (117 g of hydrogen silsesquioxane resin), was placed in a 1 L three necked round bottom flask fitted with an overhead stirrer, thermometer and condenser under argon. To this solution was added 160 g of $(Me_2HSiO)_2$ (2.4 equivalents of $(Me_2HSiO)_{0.5}$, 2.0 g of trifluoroacetic acid and 2.0 g of water. The resulting solution was refluxed 48 h. The reaction was cooled and 2.0 g of $CaCO_3$ and 10 g of water were added to neutralize the acid. The flask was fitted with a Dean Stark trap and the water was removed by azetroping dry over an 24 h period. The polymer was isolated by filtration through a 1.0 micrometer membrane and removing the solvent in vacuo at 50° C. The yield was 70 g. The polymer has a Tg of −22° C. and was characterized by GPC molecular weight analysis: Mw=4,269 and Mn=1,407 and $^{29}Si$ NMR which showed a broad doublet at −4.0 ppm $((Me)_2HSiO_{0.5})$ and a broad doublet at −85 ppm $(HSiO_{1.5})$.

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 71.2% and the ceramic analysis was C: 15.1; Si: 45.5; O: 33.4.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures.

The % weight change was found to be +1.1% and the material had the following ceramic analysis C: 11.9; Si: 42.5; O: 37.5.

EXAMPLE 7

Composite Fabrication

A slurry of 12.1 g silicon nitride in 36.2 g of an 18 wt % solution of the modified H-resin of Example 5 (9 g), 7.2 g of vinyl functional siloxane fluid of the formula $(MeSiO_{1.5})_{0.10}(MeViSiO)_{0.90}$ and 0.4 g of Lupersol 101® (2,5-bis(t-butylperoxy)-2,3-dimethylhexane) was used to impregnate a 15 cm×15 cm piece of heat treated, BN coated Ceramic Grade, 8 harness satin weave Nicalon® cloth (10 g). The cloth was cut into six 5 cm×7.5 cm, stacked, vacuum baged, heated to 118° C. for 2 minutes before applying 14 kg/cm² for 30 minutes, heated further to 194° C., 278° C. then 166° C. The cured plate had a thickness of 0.35 mm/ply and a weight of 16.66 g. The plate was pyrolyzed to 1200° C. under an inert atmosphere. After pyrolysis, the composite was densified to about 5% open porosity by 5 reinfiltration cycles comprising impreganation with an 80:20 mixture of the modified H-resin polymer of Example 6:vinyl functional siloxane fluid of the formula $(MeSiO_{1.5})_{0.10}(MeViSiO)_{0.90}$ with 1 part Lupersol 101® followed by pyrolysis to 1200° C. under argon. Testing of the composite in a 3 point flexural test gave a strength of 1596 kg/cm² and a flexural modulus of 511,000 kg/cm².

EXAMPLE 8

Composite Fabrication

A slury of 16.7 g silicon nitride in a toluene solution (50 g) of the modified H-resin (40 g) of Example 5, 10 g of vinyl functional siloxane fluid of the formula $(MeSiO_{1.5})_{0.10}(MeViSiO)_{0.90}$ and 0.5 g of dicumuyl peroxide was used to impregnate a 21.6 cm×31.7 cm piece of heat treated, BN coated Ceramic Grade, 8 harness satin weave Nicalon® cloth (10 g). The cloth was cut into six 10 cm×10 cm, stacked, vacuum baged, heated to 250° C. over 3.5 hours and held at temperature for 6 hours. The cured elate had a thickness of 0.38 mm/ply and a weight of 45.8 g. The plate was pyrolyzed to 1200° C. under an inert atmosphere. The pyrolyzed plate had a thickness of 0.35 mm/ply, a weight of 44.78 g, an apparent porosity of 21.1% and a density of 1.95 g/cc.

The composite was densified to about 5% open porosity by 5 reinfiltration cycles comprising impreganation with an 80:20 mixture of the modified H-resin polymer of Example 6:vinyl functional siloxane fluid of the formula $(MeSiO_{1.5})_{0.10}(MeViSiO)_{0.90}$ with 1 part Lupersol 101® followed by pyrolysis to 1200° C. under argon. Testing of the composite in a 3 point flexural test gave a strength of 1820 kg/cm$^2$. A test sample of this composite was oxidized at 1100° C. for 50 hours and had a weight change of +0.19% and gave a flexural strength of 1645 kg/cm$^2$.

EXAMPLE 9

Composite Fabrication

A slurry of 16.7 g silicon carbide in a toluene solution (50 g) of the modified H-resin (40 g) of Example 5, 10 g of vinyl functional siloxane fluid of the formula $(MeSiO_{1.5})_{0.10}(MeViSiO)_{0.90}$ and 0.5 g of dicumuyl peroxide was used to impregnate a 21.6 cm×31.7 cm piece of heat treated, BN coated Ceramic Grade, 8 harness satin weave Nicalon® cloth (10 g). The cloth was cut into six 10 cm×10 cm, stacked, vacuum baged, heated to 97° C. over 10 minutes pressure was applied and the temperature was held for 1 hour. It was then heated to 247° C. over 4.5 hours and held at this temperature for 6 hours. The cured plate had a thickness of 0.35 mm/ply and a weight of 40.17 g. The plate was pyrolyzed to 1200° C. under an inert atmosphere. The pyrolyzed plate had a thickness of 0.33 mm/ply, a weight of 39.34 g, an apparent porosity of 21.1% and a density of 1.97 g/cc.

The composite was densified to about 5% open porosity by 5 reinfiltration cycles comprising impreganation with an 80:20 mixture of the modified H-resin polymer of Example 6:vinyl functional siloxane fluid of the formula $(MeSiO_{1.5})_{0.10}(MeViSiO)_{0.90}$ with 1 part Lupersol 101® followed by pyrolysis to 1200° C. under argon. Testing of the composite in a 3 point flexural test gave a strength of 2540 kg/cm$^2$. A test sample of this composite was oxidized at 1100° C. for 50 hours and had a weight change of +0.19% and gave a flexural strength of 1876 kg/cm$^2$.

EXAMPLE 10

Composite Fabrication

A slurry of 25 g silicon nitride in a toluene solution (75 g) of the modified H-resin (60 g) of Example 5, 15 g of vinyl functional siloxane fluid of the formula $(MeSiO_{1.5})_{0.10}(MeViSiO)_{0.90}$ and 0.7 g of dicumuyl peroxide was used to impregnate a 21 cm×31.7 cm piece of heat treated, BN coated Ceramic Grade, 8 harness satin weave Nicalon® cloth (10 g). The cloth was cut into six 10 cm×10 cm, stacked, vacuum baged, heated to 247° C. over 3.5 hours and held at this temperature for 6 hours. The cured plate was cut into 1.2 cm×6.7 cm test samples. The test samples were pyrolyzed to 1200° C. under an inert atmosphere. The pyrolyzed plate had an apparent porosity of 21.1% and a density of 1.95 g/cc.

The composite was densified by 4 reinfiltration cycles comprising impreganation with an 80:20 mixture of the modified H-resin polymer of Example 6:vinyl functional siloxane fluid of the formula $(MeSiO_{1.5})_{0.10}(MeViSiO)_{0.90}$ with 1 part Lupersol 101® followed by pyrolysis to 1200° C. under argon. After the first cycle the porosity was found to be 13.5% and the test sample had a flexural strength of 1323 kg/cm$^2$. After two cycles the porosity was found to be 8% and the test sample had a flexural strength of 1778 kg/cm$^2$. After three cycles the porosity was found to be 6.2% and the test sample had a flexural strength of 1771 kg/cm. After four cycles the porosity was found to be 4.9% and the test sample had a flexural strength of 1288 kg/cm$^2$.

That which is claimed is:

1. A ceramic composite comprising:
   a ceramic matrix comprising silicon, carbon and oxygen having a char stoichiometry of about $SiO_yC_z$, wherein y=1.2 to 1.6 and z=0.2 to 0.6 and the carbon content of the matrix is 9.3 wt % or less and
   within the ceramic matrix, a refractory fiber coated with a material which provides a non-bonding interface between the refractory fiber and the ceramic matrix.

2. The composite of claim 1 wherein the refractory fiber comprises silicon and carbon.

3. The composite of claim 1 wherein the fiber coating is selected from the group consisting of carbon, boron, boron nitride, silicon carbide, silicon nitride, aluminum nitride and combinations thereof.

4. The composite of claim 1 wherein about 20 to about 65 percent by volume of the composite comprises fiber.

5. The composite of claim 1 having less than about 10% open porosity.

6. The composite of claim 1 wherein the matrix also comprises fillers selected from the group consisting of boron nitride, silicon carbide, silicon nitride, silicon hexaboride, boron carbide, titanium boride, boron, titanium carbide and aluminum nitride.

7. A ceramic composite comprising:
   a ceramic matrix produced by ceramifying a modified hydrogen silsesquioxane resin wherein said matrix comprises silicon, carbon and oxygen having a char stoichiometry of about $SiO_yC_z$, wherein y=1.2 to 1.6 and z=0.2 to 0.6 and the carbon content of the matrix is 9.3 wt % or less and
   within the ceramic matrix, a refractory fiber coated with a material which provides a non-bonding interface between the refractory fiber and the ceramic matrix.

8. The composite of claim 7 wherein the refractory fiber comprises silicon and carbon.

9. The compost of claim 7 wherein the fiber coating is selected from the group consisting of carbon, boron, boron nitride, silicon carbide, silicon nitride, aluminum nitride and combinations thereof.

10. The composite of claim 7 wherein about 20 to about 65 percent by volume of the composite comprises fiber.

11. The composite of claim 7 having less than about 10% open porosity.

12. The composite of claim 7 where the matrix also comprises fillers selected from the group consisting of boron nitride, silicon carbide, silicon nitride, silicon hexaboride, boron carbide, titanium boride, titanium carbide and aluminum nitride.

13. A ceramic composite produced by the method comprising:
   (a) impregnating an assembly of refractory fibers having a interfacial coating thereon with a preceramic matrix mixture comprising a modified hydrogen silsesquioxane resin;

(b) forming the impregnated assembly of fibers into the desired shape;

(c) curing the formed impregnated assembly of fibers;

(d) heating the cured impregnated assembly of fibers of (c) to a temperature of at least 1000° C. in an inert atmosphere for a time effective to convert the modified hydrogen silsesquioxane resin to a ceramic having a carbon content of 9.3 wt % or less.

14. The composite of claim 13 wherein the refractory fiber comprises silicon and carbon.

15. The compost of claim 13 wherein the interfacial coating is selected from the group consisting of carbon, boron, boron nitride, silicon carbide, silicon nitride, aluminum nitride and combinations thereof.

16. The composite of claim 13 having less than about 10% open porosity.

17. The composite of claim 13 where the preceramic matrix mixture also comprises fillers selected from the group consisting of boron nitride, silicon carbide, silicon nitride, silicon hexaboride, boron carbide, titanium boride, titanium carbide and aluminum nitride.

* * * * *